United States Patent [19]

Strauss et al.

[11] 4,454,424
[45] Jun. 12, 1984

[54] NEUTRON POSITION-SENSITIVE SCINTILLATION DETECTOR

[75] Inventors: Michael G. Strauss, Downers Grove; Raul Brenner, Woodridge, both of Ill.

[73] Assignee: The United States of America as represented by the United States Department of Energy, Washington, D.C.

[21] Appl. No.: 307,032

[22] Filed: Sep. 29, 1981

[51] Int. Cl.³ .............................................. G01T 3/06
[52] U.S. Cl. .................................... 250/390; 250/366; 250/368
[58] Field of Search ............... 250/366, 368, 390, 392, 250/361 R

[56] References Cited

U.S. PATENT DOCUMENTS

| | | | |
|---|---|---|---|
| 3,087,060 | 4/1963 | Omohundro et al. | 250/361 |
| 3,398,278 | 8/1968 | Splichal, Jr. | |
| 3,452,197 | 6/1969 | Saylor, Jr. et al. | |
| 3,614,437 | 10/1971 | Allemand et al. | |
| 3,729,631 | 4/1973 | Pszona | |
| 4,090,081 | 5/1978 | Takami et al. | 250/368 |
| 4,090,083 | 5/1978 | Wyvill | 250/368 |
| 4,180,736 | 12/1979 | Goodman | 250/363 R |
| 4,217,496 | 8/1980 | Daniels et al. | 250/369 |
| 4,217,497 | 8/1980 | Daniels et al. | 250/369 |

FOREIGN PATENT DOCUMENTS 53-9589  1/1978  Japan .................................. 250/368

OTHER PUBLICATIONS

Anger, "Scintillation Camera", Rev. Sci. Instru., 29, (1), 1–58, pp. 27–33.
Kulberg, "Improved Resolution of the Anger Scintillation Camera Through Use of Threshold Preamplifiers", J. Nuc. Med., 13, (2), pp. 169–171.
Borkowski, "Design and Properties of Position-Sensitive Proportional Counters Using Resistance-Capacitance Position Encoding," Rev. Sci. Instrum., 46, (8), Aug. 1975, pp. 951–962.
Baker, "An Investigation of the Parameters in Scintillation Camera Design", Phys. Med. Biol., 12, (1), 1967, pp. 51–63.
Kazakevich, "Flat Slow-Neutron Scintillation Detector with a Bent Lightguide", Instrum. & Exp. Tech, (USA), 15, (4), pt. 1, Jul.–Aug. 1972, pp. 1049–1051.
Harshaw Trade Brochure, undated, "Other Harshaw Scintillation Phosphors", pp. 20–21.
Lynch, "Neutron-Position Scintillation Detector-Initial Performance", Bull. Am. PHys. Soc., 25, (3), Mar. 1980, p. 366.

*Primary Examiner*—Alfred E. Smith
*Assistant Examiner*—Carolyn E. Fields
*Attorney, Agent, or Firm*—Bruce R. Mansfield; Paul A. Gottlieb; Michael F. Esposito

[57] ABSTRACT

A device is provided for mapping one- and two-dimensional distributions of neutron-positions in a scintillation detector. The device consists of a lithium glass scintillator coupled by an air gap and a light coupler to an array of photomultipliers. The air gap concentrates light flashes from the scintillator, whereas the light coupler disperses this concentrated light to a predetermined fraction of the photomultiplier tube array.

9 Claims, 3 Drawing Figures

NEUTRON POSITION-SENSITIVE SCINTILLATION DETECTOR

CONTRACTUAL ORIGIN OF THE INVENTION

The United States Government has rights in this invention pursuant to Contract No. W-31-109-Eng-38 between the U.S. Department of Energy and Argonne National Laboratory.

BACKGROUND OF THE INVENTION

The present invention relates to a means for neutron-position detection.

Prior to the invention of the neutron position scintillation detector by the inventors of the present invention, the gas proportional counter was the only neutron position-sensitive detector in existence. To achieve acceptable detection efficiencies in a gas proportional counter, the gas must be at high pressure, and thus a massive structure is required to contain the gas. Also, the space that the gas occupies must have considerable depth. Due to this depth, there are parallax errors or position uncertainties in detection. The massive structure required for the high pressure results in scattering which degrades the angular distribution measurement. In addition to these spatial response problems, fabrication of the gas proportional counter is complex and costly.

It is therefore an object of this invention to provide an improved device for mapping one-dimensional and two-dimensional distributions of neutrons which has an increased neutron detection efficiency.

Another object of this invention is to provide a one-dimensional and a two-dimensional neutron position scintillation detector having an improved position response.

Yet another object of the present invention is to provide a one-dimensional and a two-dimensional neutron-position scintillation detector which concentrates scintillations on a predetermined number of photomultiplier tubes, thereby improving the spatial resolution by increasing the signal-to-noise ratio in the photomultiplier tubes output signals.

Additional objects, advantages and novel features of the invention will be set forth in part in the description which follows, and in part will become apparent to those skilled in the art upon examination of the following or may be learned by practice of the invention. The objects and advantages of the invention may be realized and allowed by means of the instrumentalities and combinations particularly pointed out in the appended claims.

SUMMARY OF THE INVENTION

An improved two-dimensional neutron-position scintillation detector is provided. The device consists of a glass scintillator coupled through an air gap and a light coupler to an array of photomultiplier tubes. The air gap concentrates light flashes from the scintillator, whereas the light coupler disperses this concentrated light to a predetermined number of the photomultiplier tube array. Weighting resistors connected to the photomultipliers produce outputs corresponding to the X and Y centroid coordinates of the scintillation. A summer adds all of the photomultiplier outputs, producing an output signal E. Dividers are connected to the weighting resistor circuits and to the summer to produce normalized coordinate signals X/E and Y/E. A single channel analyzer is connected to the summer to reject gamma rays. The dividers are coupled through analog-to-digital converters to a computer which stores and displays the spatial distribution of the neutron interactions in the detector. The invention also provides an improved one-dimensional neutron-position scintillation detector.

DETAILED DESCRIPTION OF THE PREFERRED EMBODIMENT

Figure 1:
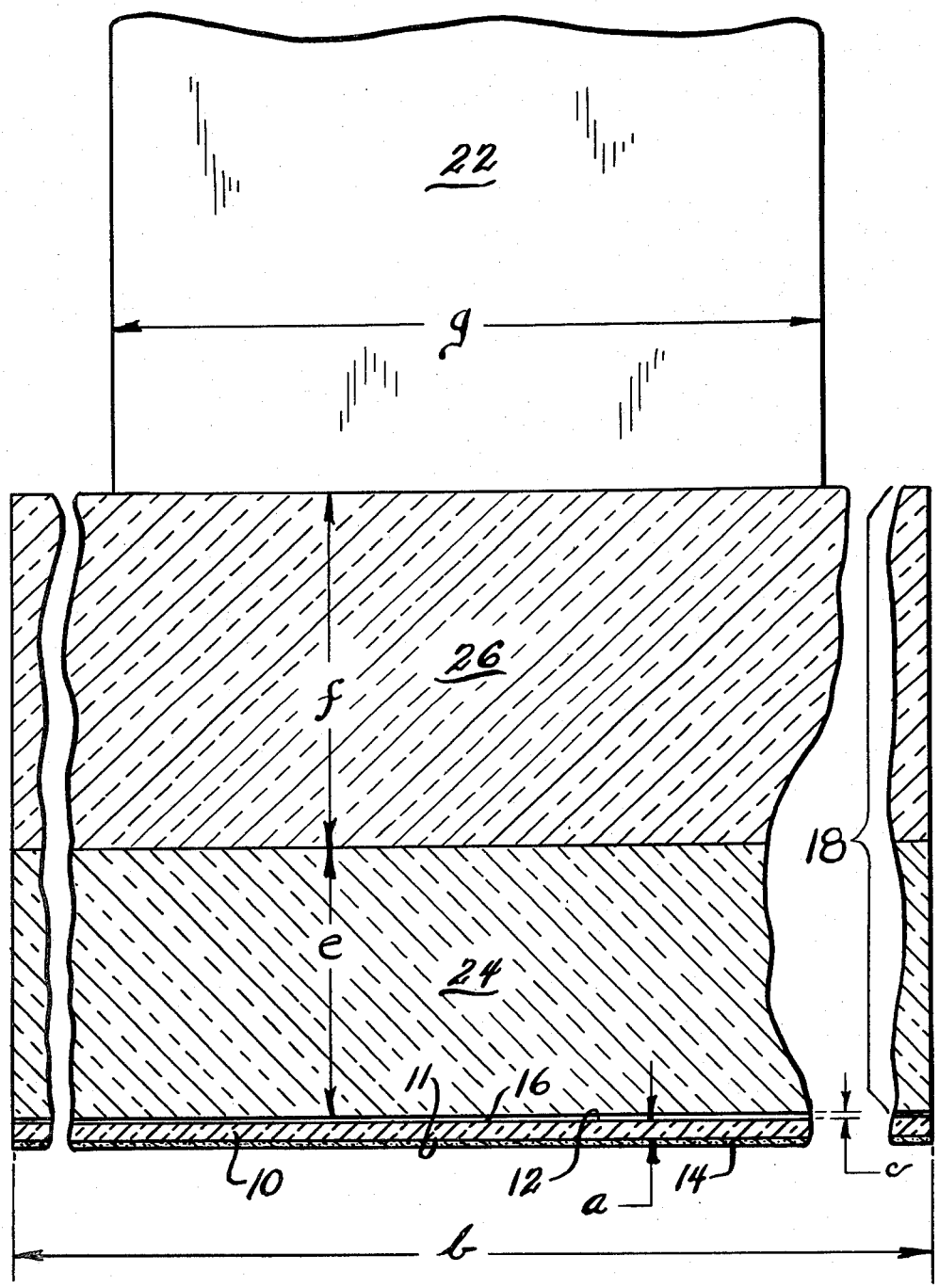
FIG. 1 is a cross sectional view of a scintillation detector according to the invention.

Referring now to FIG. 1, a cross-sectional view of a two-dimensional neutron-position scintillation detector according to the invention is shown. Scintillator 10 is preferably a $^6$Li-loaded, cerium activated glass. One example of the scintillator is a type GS-20 manufactured by Levy West Laboratories, Middlesex, U.K. Alternatively, scintillator 10 may also be comprised of silver-activated zinc sulfide material, although this material is more opaque and is therefore not preferred. In the preferred embodiment, scintillator 10 is 1 mm thick and has a 220 mm diameter (see FIG. 1, dimensions a and b, respectively). At present, a single piece of glass of the above stated dimensions cannot be made, and accordingly scintillator 10 is made up of four optically cemented quadrants of lithium glass. The gamma-ray efficiency of the 1 mm thick, low Z glass is low compared with the neutron efficiency, thus providing for very effective rejection of the gamma-ray background. In the operating range of interest, for thermal neutrons, (i.e., neutrons having energies less than 0.1 ev) and gamma-rays having 1 Mev and greater energies, the detection efficiency for neutrons compared to gamma-rays lies between $10^3$ and $10^4$. To further discriminate against gamma-ray interactions, special circuitry is provided, as will be explained below. The outer face 11 of scintillator 10 is ground, and the inner face 12 is polished. A diffuse reflector 14 of $Al_2O_3$ powder is positioned adjacent the outer face 11 of scintillator 10.

The light emanating from scintillator 10 is transmitted through an air gap 16 and a two-piece coupler 18 to a close packed hexagonal array of 19 round photomultiplier tubes 22. In the preferred embodiment, scintillator 10, coupler 18 and the array of photomultiplier tubes all have a diameter b of 22 cm and are mounted inside a light-tight container, not shown in FIG. 1. Air gap 16 has a thickness c of less than 0.1 mm, whereas scintillator 10 has a thickness of 1 mm and light coupler 18 has a thickness d of 44 mm. Light coupler 18 is of two-piece construction, comprising a layer 24 of Pyrex light transmitting medium, and a layer 26 of Plexiglass light transmitting medium. Layers 24, 26 have thicknesses e, f of 19 mm and 25 mm, respectively. The Pyrex light transmitting medium, a neutron absorber because of its boron content, is used as part of the light coupler to shield the scintillator from neutrons which scatter from the Plexiglass light transmitting medium and/or other structure into the back of detector. Photomultipliers 22 are Hamamatsu type R878 and have a diameter g of 5 cm.

Scintillations originating in the 1 mm thick scintillator 10 produce forward directed light which approaches the interface between scintillator 10 and air gap 16. Any rearward directed light of a scintillation is reflected by diffuse reflector 14 in a forward direction. The scintillation of a single neutron interaction within scintillator 10 is simultaneously viewed by a predetermined number of photomultiplier tubes. This dispersion of scintillation light is provided by the 44 mm thick light coupler 18 which separates scintillator 10 from the array of photomultiplier tubes 22. By virtue of the separation provided by this light coupler, each scintillation is dispersed so as to be seen by more than one photomultiplier. This permits centroid determination by interpolation. The thickness of the light coupler 18 was selected empirically to give optimum spatial resolution and linearity. This thickness approaches the diameter of the photocathode of photomultipliers 22.

Figure 3:
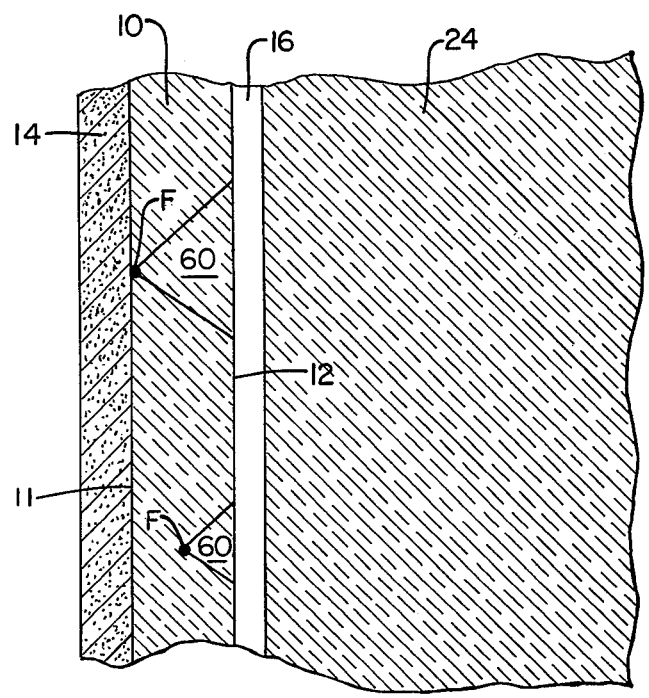
FIG. 3 is an exploded partial view of a portion of FIG. 1.

Air gap 16 limits the spreading of forward directed light by producing, at the inner face 12 of scintillator 10, a critical refraction angle of forty degrees (40°) with respect to the longitudinal axis of the detector device. Forwardly directed light rays having an incident angle less than forty degrees are transmitted through air gap 16 into light coupler 18. Since air gap 16 is very narrow (approximately 0.1 mm), the light rays entering light coupler 18 have a negligible lateral displacement, i.e., displacement in planes perpendicular to the longitudinal axis of the detector device. Since light coupler 18 has an index of refraction similar to that of scintillator 10, light rays emerge from air gap 16 in the same direction as their entrance therein. As illustrated in FIG. 3, the index of refraction of air gap 16, the polished face 12 of scintillator 10 and the adjacent face and index of refraction of light coupler 18, together comprise a light concentrator which limits transmission of light flashes from scintillator 10 to a predeterminedly dimensioned cone 60 which opens toward the light coupler 18 with an 80 degree included angle. Light rays having an incident angle greater than forty degrees are totally reflected rearwardly at air gap 16, being scattered back in a forward direction by diffuse reflector 14. In this way, most of the light of each scintillation undergoes multiple internal reflections before entering into light coupler 18, and thus about 80% of the available light of each scintillation is utilized. The air gap in effect concentrates the illumination of each scintillator on a predetermined number of photomultipliers 22 at points aligned in registry with the point of scintillation occurring in scintillator 10.

In the preferred embodiment of the invention, air gap 16 acts as a light concentrator that limits the dispersion of each scintillation to no more than seven photomultipliers, regardless of the total number of photomultipliers provided in the detector device. In the preferred embodiment, 19 round photomultipliers are provided, but the number of picture elements which can be resolved is not limited to this number because scintillations which occur at intermediate points between phototubes are reproduced in their original position by a process of two-dimensional interpolation of the simultaneous signals arising from all the photomultipliers which view the scintillation. The ability of the present invention to concentrate light flashes from the scintillator eliminates loss of scintillation light, and prevents the spreading of light over a large number of photomultiplier tubes. Dilution or spreading of light increases the statistical uncertainty of the neutron interaction centroid signals, particularly at the scintillator edge.

Referring now to FIG. 3, the index of refraction of air gap 16, the polished face 12 and index of refraction of scintillator 10, and the adjacent face and index of refraction of light coupler 18 together comprise a light concentrator which limits transmission of light flashes "F" from scintillator 10 to predeterminently dimensioned cones 60 which open toward light coupler 18.

Figure 2:
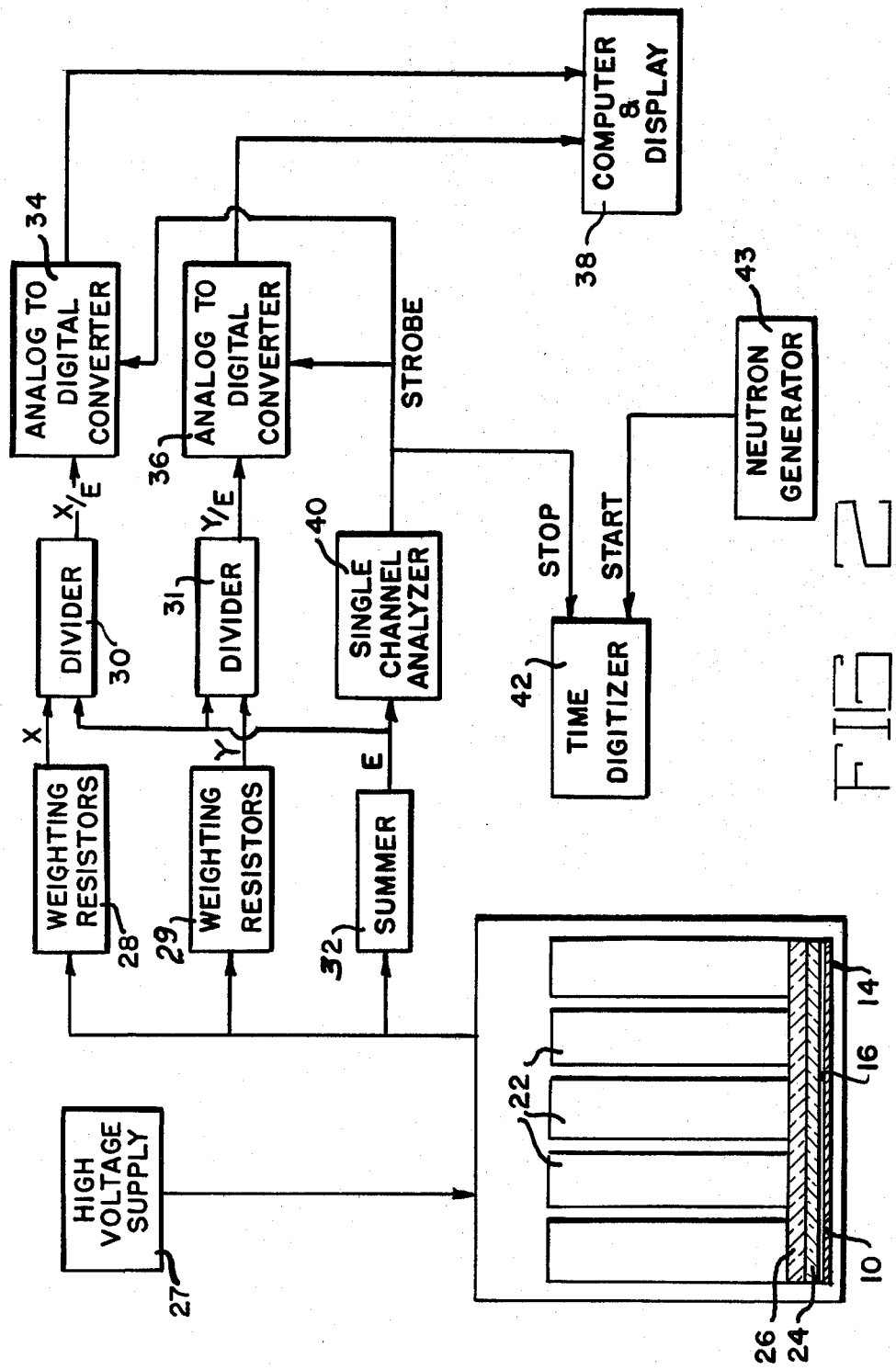
FIG. 2 is a block diagram of an apparatus for mapping two-dimensional distributions of neutron positions in the scintillation detector of FIG. 1.

A high voltage from supply 27 is applied to photomultipliers 22 to provide for secondary emmission therein. The position of the neutron interaction in scintillator 10 is determined by a position encoding circuit which calculates the centroid of a scintillation as viewed by the photomultiplier tubes. Referring now to FIG. 2, operation of the position encoding circuit will be explained. The outputs of the photomultipliers are encoded by weighting resistors 28, 29 into X and Y signals. Dividers 30, 31 divide the X and Y signals by the unweighted sum E signal of all the photomultiplier signals produced by summer 32 and provide the normalized coordinate signals X/E and Y/E. The normalization results in coordinate signals which are independent of fluctuations in E. By virtue of the light coupler 18, each scintillation is seen by more than one photomultiplier. This permits centroid determination by interpolation, which is the underlying basis for obtaining high spatial resolution with this type of detector system. The coordinate signals are thereafter digitized by the analog-to-digital converters (ADC) 34, 36, stored and displayed by the computer 38. The single-channel-analyzer (SCA) window 40 is set to bracket the neutron peak, thereby discriminating against gamma-ray background. When the sum signal is due to a neutron and not a gamma ray, it falls in the SCA window, thereby enabling the coordinate signals to be digitized and stored in the computer.

In addition to the neutron-position determination and gamma-ray discrimination circuits, a time digitizer 42, receiving start and stop signals from SCA 40 and neutron generator 43 respectively, determines the neutron time-of-flight. These data are used to determine the energy of the neutron being detected. Timing uncertainties due to the 1 mm thickness of the scintillator are negligible compared with the overall 10 meter flight path of the neutrons. Since most of the scintillation pulses decay in $10^{-7}$ sec, the detector lends itself to high counting rates.

In addition to the low gamma ray sensitivity of the thin scintillator and the discrimination of the circuitry described above, further rejection of gamma rays may be realized by substituting a similarly sized disc of Cesium Iodide [CsI(Tl)] for Plexiglas section 26. Gamma rays which Compton scatter in the lithium glass of scintillator 10 will interact in the CsI(Tl) disk. Since the decay constant of CsI(Tl) is longer (1 microsecond) than that of the scintillator glass (0.1 microsecond) it is possible to identify and reject gamma-ray events which occur in both scintillator 10, and CsI(Tl) section 26.

Improved light collection, and therefore improved spatial resolution was realized in another embodiment of the invention. In this embodiment, the scintillator light coupler and photomultiplier tubes are of generally square configuration, thus obviating the need in the case of round tubes, for inter-photomultiplier tube diffusers or the like light collection improvement means. The detector has a viewing area of 30 cm×30 cm. The scintillator is 2 mm thick and is comprised of four optically-cemented quadrants, as before. The air gap is also 0.1 mm, but the light coupler thickness was changed to 35 mm wherein only the Plexiglass light transmitting medium thickness was changed (to 16 mm). The photomultiplier tubes whose side walls were all in direct contact with each other, had viewing areas of 51 mm×51 mm.

In yet another embodiment of the invention, a single-dimension detector was designed having rectangular scintillator, light coupler and photomultiplier tube arrays. The array of photomultiplier tubes comprised a single row of square photomultiplier tubes having adjacent end walls in direct contact with each other. The term "array" as used herein does not necessarily denote a two-dimensional configuration, but includes single-dimensioned configurations as well. The thicknesses of the scintillator, air gap, and light coupler were proportioned to their counterparts set forth above with respect to the two-dimensional square configuration. Of course, single-dimension round configurations employing arrays of round photomultiplier tubes also fall within the ambit of the present invention.

The embodiment of the invention in which an exclusive property or privilege is claimed are defined as follows:

1. An apparatus for mapping distributions of neutron positions in a scintillation detector comprising:

a scintillator sensitive to neutrons while being insensitive to gamma rays, said scintillator having a polished face, a predetermined index of refraction, and a detection efficiency for thermal neutrons at least 1000 times greater than its detection efficiency for 1 Mev gamma rays, said scintillator emanating light flashes at points of neutron interactions therewithin;

a plurality of photomultiplier means arranged to form an array and positioned to receive the light flashes of said scintillator, each of said photomultiplier means producing an output electronic signal proportional to the amount of light received by said photomultiplier means;

light coupler means having an index of refraction approximately equal to said predetermined index of refraction of said scintillator, said light coupler means spacing said scintillator from said photomultiplier means;

light concentrator means having an index of refraction lower than the indices of refraction of said scintillator and said light coupler means, disposed between and immediately adjacent said polished face of said scintillator and said light coupler means;

said scintillator, said light concentrator means and said light coupler means cooperating so as to direct flashes of said scintillator on at least two photomultiplier means in any dimension mapped by said apparatus; said light coupler means dispersing the concentrated flashes of said light concentration means;

position encoding electronic circuit means coupled to the electrical outputs of said plurality of photomultiplier tubes for producing position signals corresponding to coordinates of the position of each light flash; and means for interpolating said photomultiplier tube signals to determine the position of said light flash whereby the position of said neutron interaction in said scintillator is determined.

2. The apparatus of claim 1 wherein said light concentrator means limits transmission of said light flashes to a predeterminedly dimensioned cone which opens toward said light coupler means.

3. The apparatus of claim 2 wherein said light concentrator means comprises an air gap interposed between said scintillator and said light coupler means.

4. The apparatus of claim 3 wherein said light coupler means further comprises neutron absorbing means for absorbing scattered neutrons.

5. The apparatus of claim 4 wherein said neutron absorbing means comprises boron-loaded glass.

6. The apparatus of claim 5 wherein said light coupler means further comprises means for absorbing gamma rays.

7. The apparatus of claim 6 wherein said gamma ray absorbing means comprises CsI(Tl).

8. The apparatus of claim 4 wherein said scintillator comprises $^6$Li-loaded, cerium activated glass.

9. The apparatus of claim 8 wherein said light flashes are transmitted to no more than 3 photomultiplier means in any dimension mapped by said apparatus.

* * * * *